United States Patent
Wu et al.

(10) Patent No.: US 12,184,146 B1
(45) Date of Patent: Dec. 31, 2024

(54) INTEGRATED MOTOR

(71) Applicant: NANCHANG SANRUI INTELLIGENT TECHNOLOGY CO., LTD., Nanchang (CN)

(72) Inventors: Xiaoguang Wu, Nanchang (CN); Min Wu, Nanchang (CN); Yi Li, Nanchang (CN)

(73) Assignee: NANCHANG SANRUI INTELLIGENT TECHNOLOGY CO., LTD., Nanchang (CN)

( * ) Notice: Subject to any disclaimer, the term of this patent is extended or adjusted under 35 U.S.C. 154(b) by 0 days.

(21) Appl. No.: 18/743,708

(22) Filed: Jun. 14, 2024

Related U.S. Application Data

(63) Continuation of application No. PCT/CN2024/091308, filed on May 7, 2024.

(30) Foreign Application Priority Data

Oct. 18, 2023 (CN) .......................... 202311347028.8

(51) Int. Cl.
*H02K 5/10* (2006.01)
*H02K 5/20* (2006.01)

(52) U.S. Cl.
CPC ................. *H02K 5/10* (2013.01); *H02K 5/20* (2013.01)

(58) Field of Classification Search
CPC .... H02K 1/187; H02K 1/2786; H02K 1/2787; H02K 1/2789; H02K 1/2791;
(Continued)

(56) References Cited

U.S. PATENT DOCUMENTS

2020/0177056 A1* 6/2020 Nakamura ............. H02K 5/203

FOREIGN PATENT DOCUMENTS

| CN | 205396558 U | 7/2016 |
| CN | 206149106 U | 5/2017 |

(Continued)

OTHER PUBLICATIONS

Park, Machine Translation of KR20190014743, Feb. 2019 (Year: 2019).*

(Continued)

*Primary Examiner* — Eric Johnson
(74) *Attorney, Agent, or Firm* — Daniel M. Cohn; Howard M. Cohn

(57) ABSTRACT

An integrated motor is provided, including a cover assembly and a housing assembly. The housing assembly is detachably connected to the cover assembly. The cover assembly includes a housing sub-assembly, a motor sub-assembly, and a connecting sub-assembly, the motor sub-assembly is disposed in the housing sub-assembly, and the connecting sub-assembly is matched with the housing assembly. The housing sub-assembly includes a top cover and a tubular housing, the tubular housing is connected to the top cover. The housing assembly includes a bottom cover and an electronic speed controller sub-assembly, the bottom cover is matched with the tubular housing, and the electronic speed controller sub-assembly is disposed in the bottom cover. The top cover, the tubular hosing, and the bottom cover are enclosed to form an accommodating space for accommodating the motor sub-assembly and the electronic speed controller sub-assembly.

6 Claims, 5 Drawing Sheets

(58) Field of Classification Search
CPC .... H02K 1/27915; H02K 1/2792; H02K 5/10; H02K 5/20; H02K 5/207; H02K 9/02; H02K 9/04; H02K 9/06; H02K 11/30; H02K 11/33; H02K 21/22; B64U 20/80; B64U 20/83; B64U 20/94; B64U 50/19
See application file for complete search history.

(56) References Cited

FOREIGN PATENT DOCUMENTS

| | | | | |
|---|---|---|---|---|
| CN | 206402017 U | 8/2017 | | |
| CN | 208209745 U | 12/2018 | | |
| CN | 208337347 U | 1/2019 | | |
| CN | 109661762 A | 4/2019 | | |
| CN | 211046698 U | 7/2020 | | |
| CN | 211456939 U | 9/2020 | | |
| CN | 215285277 U | 12/2021 | | |
| CN | 219394545 U | 7/2023 | | |
| KR | 20170139954 A | 12/2017 | | |
| KR | 20190014743 A | * | 2/2019 | |
| WO | WO-2018126536 A1 | * | 7/2018 | ............. B64C 27/08 |

OTHER PUBLICATIONS

Deng, Machine Translation of WO2018126536,Jul. 2018 (Year: 2018).*
Notification to Grant Patent Right for Invention, Chinese Application No. 202311347028.8 mailed Dec. 19, 2023 (3 pages).
CNIPA, Office Action issued for Chinese Application No. 202311347028.8, mailed Nov. 24, 2023 (11 pages).

* cited by examiner

INTEGRATED MOTOR

TECHNICAL FIELD

The present disclosure relates to a technical field of motors, and in particular to an integrated motor.

BACKGROUND

Unmanned aerial vehicles (UAVs) are unmanned aircrafts each being provided with a program control device to match with a corresponding radio remote control device, the UAVs are widely used in many fields, such as aerial photography, monitoring, agriculture, etc., and have strong research value. Power systems of current UAVs are generally provided with motors, electronic speed controllers, LED lampshades, and carbon fiber tubes to arrange and fix on middle arms of the UASs, specifically, the motors are fixed on the middle arms of the UAVs through motor bases, the electronic speed controllers are directly fixed on the middle arms of the UAVs or are arranged below the motor bases, the motors and the electronic speed controllers are connected through external wires.

Since each of the UAVs is generally provided with a plurality of motors, a plurality of electronic speed controllers are further required to control corresponding motors, an assembly process of which is tedious, and an assembly body thereof occupies a large space, an assembly weight of the plurality of the motors and the plurality of the electronic speed controllers on the middle arms of the UAVs increases burden of the UAVs in flight, meanwhile, external wires for connecting the plurality of the motors and the plurality of the electronic speed controllers are exposed to an external environment, which are easily damaged by external rainwater or other external things, thereby having a strong impact on normal operation of the plurality of the electronic speed controllers and the plurality of the motors.

SUMMARY

Based on above, the present disclosure aims to provide an integrated motor for solving a technical problem that independent assembly processes of a motor and an electronic speed controller in a power system of a current unmanned aerial vehicle (UAV) is tedious and is easily damaged by an external environment.

The present disclosure aims to provide the integrated motor, including a cover assembly and a housing assembly. The housing assembly is detachably connected to the cover assembly. The cover assembly includes a housing sub-assembly, a motor sub-assembly, and a connecting sub-assembly, the motor sub-assembly is disposed in the housing sub-assembly, and the connecting sub-assembly is matched with the housing assembly. The housing sub-assembly includes a top cover and a tubular housing, the tubular housing is connected to the top cover. The housing assembly includes a bottom cover and an electronic speed controller sub-assembly, the bottom cover is matched with the tubular housing, and the electronic speed controller sub-assembly is disposed in the bottom cover. The top cover, the tubular hosing, and the bottom cover are enclosed to form an accommodating space for accommodating the motor sub-assembly and the electronic speed controller sub-assembly.

Furthermore, the connecting sub-assembly includes a fixing portion, first connecting portions, and second connecting portions, the first connecting portions and the second connecting portions extend outward from the fixing portion, a bearing limiting groove is defined on the fixing portion, end surfaces of the first connecting portions extend further than end surfaces of the second connecting portions, and screw holes are respectively defined on the first connecting portions and the second connecting portions.

Furthermore, the motor sub-assembly includes a rotating shaft, a bearing, a motor winding iron core, and magnetic blocks, the rotating shaft is connected to the top cover, the bearing is fixed in the bearing limiting groove, the motor winding iron core is fixedly connected to a periphery of the fixing portion, and the magnetic blocks are fixedly connected to an inner wall of the tubular housing.

Furthermore, the top cover includes a cover plate, top cover reinforcing ribs, and a top cover sleeve ring, the top cover reinforcing ribs extend outward from an inner wall of the cover plate, and the top cover reinforcing ribs are fixedly connected to the top cover sleeve ring. A rotating shaft mounting hole is defined on the cover plate and is matched with the rotating shaft, a top cover heat dissipation hole is defined between adjacent two of the top cover reinforcing ribs. Clamping blocks extend outward from one side of the top cover sleeve ring away from the inner wall of the cover plate, and a clamping groove for limiting a corresponding one of the magnetic blocks is defined between adjacent two of the clamping blocks.

Furthermore, the bottom cover includes a cavity body, bottom cover reinforcing ribs, and a bottom cover sleeve ring, the bottom cover reinforcing ribs extend outward from a periphery of the cavity body, and the bottom cover reinforcing ribs are fixedly connected to the bottom cover sleeve ring. A bottom cover heat dissipation hole is defined between adjacent two of the bottom cover reinforcing ribs, two lampshade mounting ribs extend outward from the periphery of the cavity body and is fixedly connected to the bottom cover sleeve ring, a lampshade mounting hole is defined between the two lampshade mounting ribs.

Furthermore, the cavity body includes an accommodating groove, connecting through holes, and bottom cover connecting portions, the connecting through holes are respectively matched with the first connecting portions, and the bottom cover connecting portions are respectively matched with the second connecting portions. A wire hole is defined on a side wall of the cavity body, and a toothed heat dissipation groove is defined on an outer surface of the cavity body.

Furthermore, the electronic speed controller sub-assembly includes an electronic speed controller, a lampshade assembly, and a wire hole rubber sleeve. the electronic speed controller is fixedly connected to an inner surface of the cavity body, the lampshade assembly is fixedly connected in the lampshade mounting hole, and the wire hole rubber sleeve is matched with the wire hole, a magnetic encoder is connected to the electronic speed controller.

Furthermore, a first end of the tubular housing is close to the top cover, an inner wall of a first side of the tubular housing is attached to an outer wall of the top cover sleeve ring, and a reinforcing ring is fixedly connected to an outer wall of the first side of the tubular housing; a second end of the tubular housing is away from the top cover, a first joint portion is disposed on the second end of the tubular housing, a second joint portion matched with the first joint portion is disposed on the bottom cover sleeve ring, the first joint portion includes an inclined surface matched with an inclined surface of the second joint portion.

Furthermore, the cover assembly further includes a dust-proof cover, the dust-proof cover is fixedly connected to the top cover. The housing assembly further includes a dust-proof ring, the dust-proof ring is fixedly connected to the bottom cover.

Furthermore, the integrated motor further includes a connector, the connector is detachably connected to one side of the bottom cover away from the top cover through the first connecting portions.

Compared with the prior art, beneficial effects of the present disclosure are as follows.

The cover assembly and the housing assembly are provided to form a housing main body for mounting the motor sub-assembly and the electronic speed controller sub-assembly at the same time, and the connecting sub-assembly is further provided to achieve detachable connection between the motor sub-assembly and the electronic speed controller sub-assembly, so that the integrated motor is convenient in assembly and disassembly, simple and compact in assembly structure, and small in size. Moreover, the motor sub-assembly and the electronic speed controller sub-assembly are both disposed in the housing main body, in this way, the motor sub-assembly and the electronic speed controller sub-assembly are avoided from being in direct contact with the external environment, and protection performance of the motor sub-assembly and the electronic speed controller sub-assembly is further improved.

Figure 1:
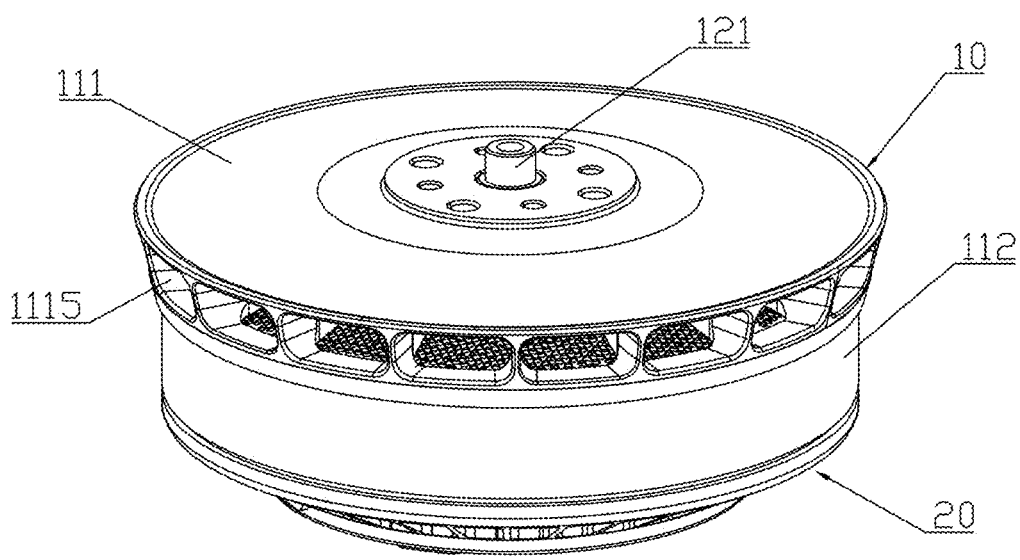
FIG. 1 is a three-dimensional structural schematic diagram of an integrated motor according to one embodiment of the present disclosure.

Reference numerals in the drawings: 10. cover assembly; 11. housing sub-assembly; 111. top cover; 1111. cover plate; 1112. top cover reinforcing rib; 1113. top cover sleeve ring; 1114. rotating shaft mounting hole; 1115. top cover heat dissipation hole; 1116. clamping block; 1117. clamping groove; 1120. tubular housing; 1121. first joint portion; 113. dust-proof cover; 114. reinforcing ring; 12. motor sub-assembly; 121. rotating shaft; 122. magnetic block; 123. bearing; 124. motor winding iron core; 13. connecting sub-assembly; 131. fixing portion; 132. first connecting portion; 133. second connecting portion; 20. housing assembly; 21. bottom cover; 211. cavity body; 2111. accommodating groove; 2112. connecting through hole; 2113. bottom cover connecting portion; 2114. wire hole; 212. bottom cover reinforcing rib; 213. bottom cover sleeve ring; 2131. second joint portion; 214. bottom cover heat dissipation hole; 215. lampshade mounting rib; 216. lampshade mounting hole; 217. dust-proof ring; 218. toothed heat dissipation groove; 22. electronic speed controller sub-assembly; 221. electronic speed controller; 222. lampshade; 223. wire hole rubber sleeve; 30. connector.

Following detailed description is further described in conjunction with the accompanying drawings.

DETAILED DESCRIPTION OF EMBODIMENTS

In order to facilitate understanding of the present disclosure, the present disclosure is described more fully hereinafter with reference to accompanying drawings. Several embodiments of the present disclosure are shown in the accompanying drawings. However, the present disclosure may be implemented in many different forms and is not limited to the embodiments described herein. On the contrary, a purpose of providing these embodiments is to make the present disclosure more thorough and comprehensive.

It should be noted that when an element is referred to as being "fixed to" another element, it may be directly on another element or intervening elements may also be present. When an element is considered to be "connected" to another element, it may be directly connected to another element or intervening elements may be present at the same time. Terms "vertical", "horizontal", "left", "right", and similar expressions used herein are for illustrative purposes only.

Unless otherwise defined, all technical and scientific terms used herein have the same meaning as commonly understood by those who skilled in the art to which the present disclosure belongs. Terminologies used herein in specification of the present disclosure are for a purpose of describing particular embodiments only and is not intended to limit the present disclosure. As used herein, a term "an/or" includes any and all combinations of one or more related listed items.

Please refer to FIGS. 1-6, the present disclosure provides an integrated motor, including a cover assembly 10 and a housing assembly 20 detachably connected to the cover assembly 10.

Figure 2:
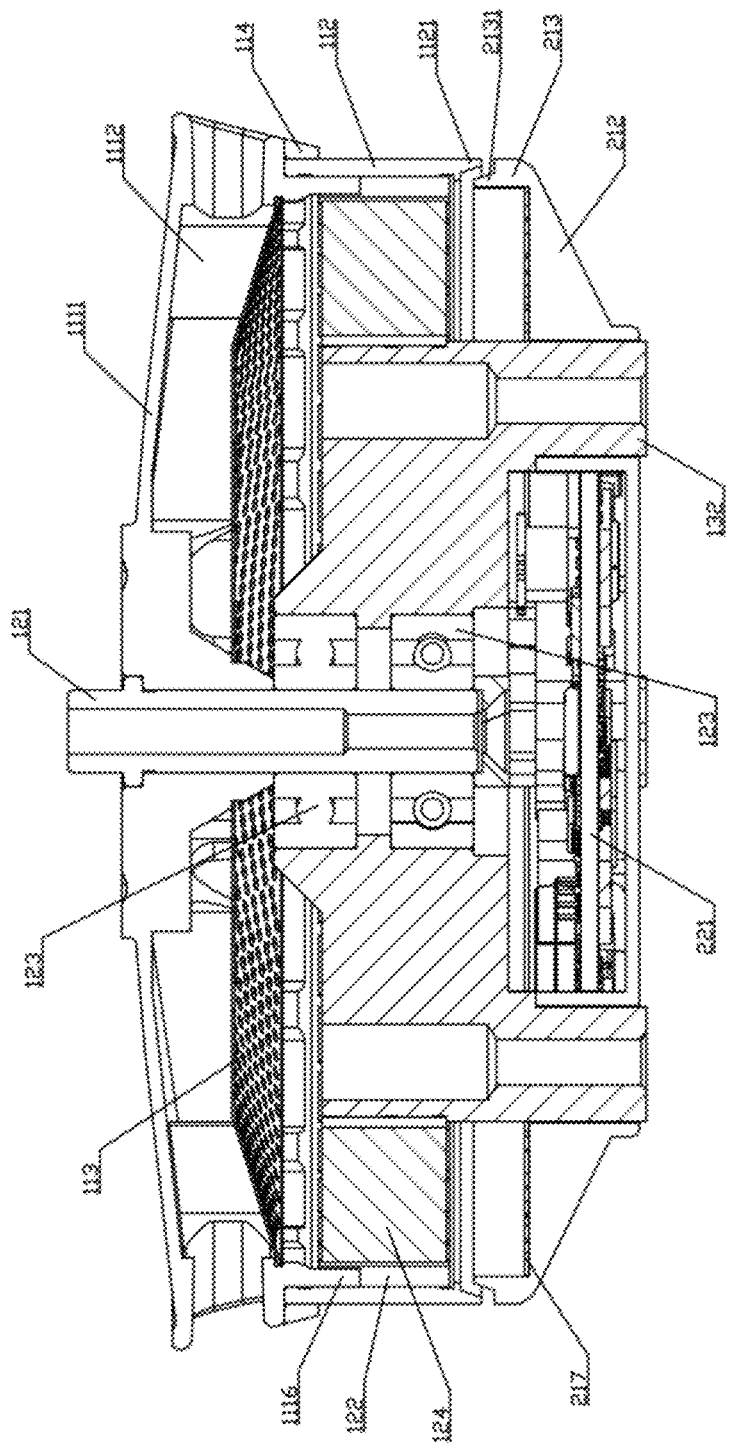
FIG. 2 is a cross-sectional schematic diagram of the integrated motor according to one embodiment of the present disclosure.
Figure 3:
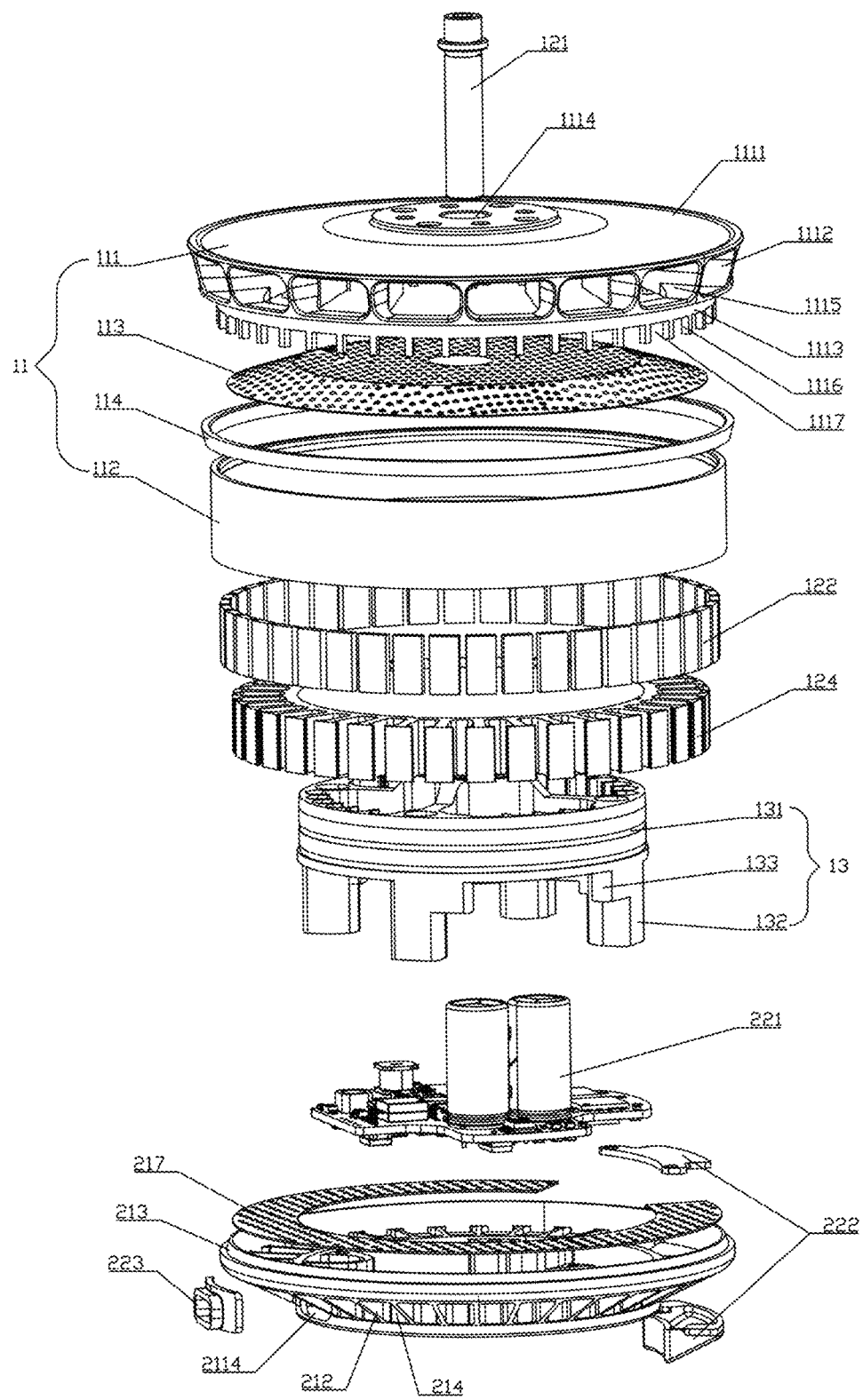
FIG. 3 is an exploded schematic diagram of the integrated motor according to one embodiment of the present disclosure.

As an example, as shown in FIGS. 2-3, the cover assembly 10 includes a housing sub-assembly 11, a motor sub-assembly 12, and a connecting sub-assembly 13, the motor sub-assembly 12 is disposed in the housing sub-assembly 11, and the connecting sub-assembly 13 is matched with the housing assembly 20. The housing sub-assembly 11 includes a top cover 111 and a tubular housing 112, the tubular housing 112 is connected to the top cover 111. As shown in FIG. 2, the tubular housing 112 is sleeved on a periphery of one end of the top cover 111 close to the tubular housing 112, the tubular housing 112 and the top cover 111 are connected to form an internal space, and the motor sub-assembly 12 is mounted in the internal space through the connecting sub-assembly 13. In one embodiment, the top cover 111 includes a cover plate 1111, top cover reinforcing ribs 1112, and a top cover sleeve ring 1113, the top cover reinforcing ribs 1112 extend outward from an inner wall of the cover plate 1111, and the top cover reinforcing ribs 1112 are fixedly connected to the top cover sleeve ring 1113. A rotating shaft mounting hole 1114 is defined on a middle of the cover plate and is matched with a rotating shaft 121, a top cover heat dissipation hole 1115 is defined between adjacent two of the top cover reinforcing ribs 1112 for improving a heat dissipation efficiency. It should be noted that a dust-proof cover 113 is fixedly connected in the top cover 111, the dust-proof cover 113 covers the motor sub-assembly 12, so that foreign matter and particles are prevented from entering an interior of the integrated motor through the top cover heat dissipation hole 1115, thereby improving a dust-proof level of the integrated motor.

At the same time, clamping blocks 1116 extend outward from one side of the top cover sleeve ring 1113 away from the inner wall of the cover plate 1111, and a clamping groove 1117 for limiting a corresponding one of magnetic blocks 122 is defined between adjacent two of the clamping blocks 1116. In a connection process of the top cover 111 and the tubular housing 112, each of the clamping blocks 1116 is inserted into a gap between adjacent two of the magnetic blocks 122, that is, each of the magnetic blocks 122 is inserted into a corresponding clamping groove 1117, in this way, the magnetic blocks 122 are fixedly connected to an inner wall of the tubular housing 112, an embedding degree between the top cover 111 and the tubular housing 112 is further improved, thereby improving connection stability between the top cover 111 and the tubular housing 112. It should be noted that, in order to further improve the connection stability between the tubular housing 112 and the top cover 111, a first end of the tubular housing 112 is sleeved on a periphery of the top cover sleeve ring 1113 and includes a first glue storage groove on an inner wall thereof for storing glue, moreover, a reinforcing ring 114 is further disposed on an outer wall of the first end of the tubular housing 112, the reinforcing ring 114 applies pressure toward a center of the top cover 111 to an outer wall of the tubular housing 112, so as to reinforce nesting connection between the top cover 111 and the tubular housing 112, improve adhesion strength of the glue in the first glue storage groove on the outer wall of the top cover sleeve ring 1113, and greatly improve the connection stability between the tubular housing 112 and the top cover 11, in this way, stability of driving the tubular housing 112 to rotate through the rotating shaft 121 in a working process of the integrated motor is ensured.

Furthermore, the motor sub-assembly 12 is configured to supply power and is mounted in the internal space of the housing sub-assembly 11 through the connecting sub-assembly 13. In the embodiment, as shown in FIGS. 2-3, the motor sub-assembly 12 includes the rotating shaft 121, the magnetic blocks 122, a bearing 123, and a motor winding iron core 124, the rotating shaft 121 is connected to the top cover 111, the magnetic blocks 122 are disposed on the inner wall of the tubular housing 112, the bearing 123 and the motor winding iron core 124 are mounted on the connecting sub-assembly 13. In the embodiment, the rotating shaft 121 and the connecting sub-assembly 13 are hollow structures, thereby reducing an overall weight of the integrated motor, specifically, the connecting sub-assembly 13 includes a fixing portion 131, first connecting portions 132, and second connecting portions 133, the first connecting portions 132 and the second connecting portions 133 extend outward from the fixing portion 131, a bearing limiting groove is defined on a middle of the fixing portion for mounting the bearing 123, the motor winding iron core 124 is fixedly connected to a periphery of the fixing portion 131, that is, the motor winding iron core 124 is sleeved on the fixing portion 132. In order to improve connection stability between the motor wingding iron core 124 and the fixing portion 132, a second glue storage groove for storing glue is defined on a middle of the periphery of the fixing portion 123, a protrusion portion for assisting the motor winding iron core 124 to press-fit extend outward from a periphery of the fixing portion 131 that connect with the first connecting portions 132. In an actual assembly process, a middle of the motor winding iron core 124 is sleeved on the fixing portion 131 until a lower end surface of the motor winding iron core 124 abuts against a surface of the protruding portion, that is, the motor winding iron core 124 is pressed on the fixing portion 131, and at this time, an upper end surface of the motor winding iron core 124 is flush with a surface of the fixing portion 131.

Furthermore, the cover assembly 10 and the housing assembly 20 are detachably connected through the first connecting portions 132 and the second connecting portions 133 of the connecting sub-assembly 13. In the embodiment, the first connecting portions 132 and the second connecting portions 133 are integrally disposed, end surfaces of the first connecting portions 132 extend further than end surfaces of the second connecting portions 133, and screw holes for connecting with bolts are respectively defined on the first connecting portions 132 and the second connecting portions. In the actual assembly process, the end surfaces of the second connecting portions 133 are in close contact with a surface of a bottom cover 21 of the housing assembly 20, and the first connecting portions 132 penetrates through the bottom cover 21, so that the end surfaces of the first connecting portions 132 are flush with or extend further than a bottom surface of the bottom cover 21.

Figure 5:
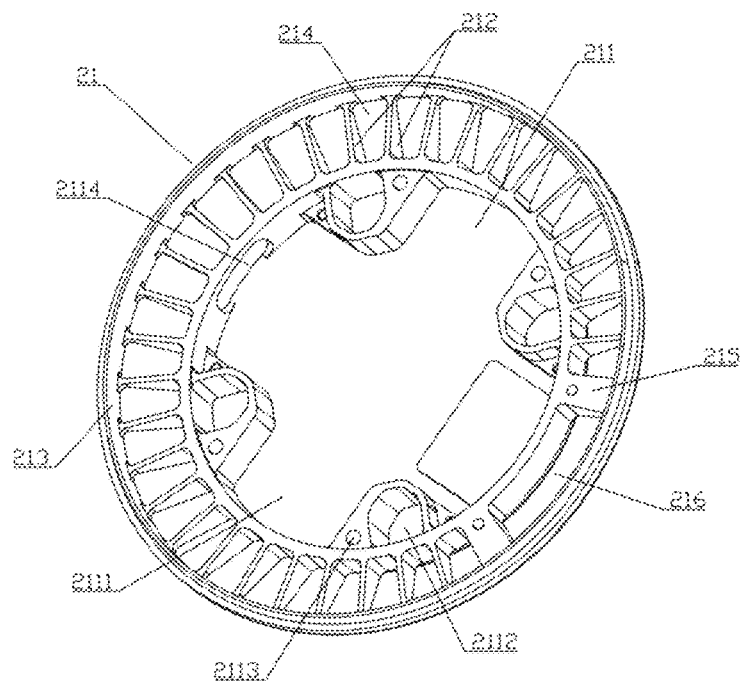
FIG. 5 is a structural schematic diagram of a bottom cover of the integrated motor according to one embodiment of the present disclosure.

As an example, the housing assembly 20 includes a bottom cover 21 and an electronic speed controller sub-assembly 22, the bottom cover 21 is matched with the tubular housing 112, and the electronic speed controller sub-assembly 22 is disposed in the bottom cover 21. In the embodiment, as shown in FIGS. 3 and 5, the bottom cover 21 includes a cavity body 211, bottom cover reinforcing ribs 212, and a bottom cover sleeve ring 213, the cavity body 211 is configured to mount an electronic speed controller 221 having a control function, the bottom cover reinforcing ribs 212 extend outward from a periphery of the cavity body 211, and the bottom cover reinforcing ribs 212 are fixedly connected to the bottom cover sleeve ring 213. Furthermore, the cavity body 211 includes an accommodating groove 2111, connecting through holes 2112, and bottom cover connecting portions 2113, the connecting through holes 2112 are respectively matched with the first connecting portions 132, and the bottom cover connecting portions 2113 are respectively matched with the second connecting portions 133, through holes for the bolts to penetrate through are respectively defined on the bottom cover connecting portions 2113. In the actual assembly process, the bolts penetrate through the through holes on the bottom cover connecting portions 2113 to screw with the screw holes on the second connecting portions 133, thereby achieving detachable connection between the bottom cover 21 and the connecting sub-assembly 13. The bottom cover reinforcing ribs 212 improve structural strength of the bottom cover 21, and at the same time, a bottom cover heat dissipation hole 214 is defined between adjacent two of the bottom cover reinforcing ribs 212, which improves a heat dissipation effect during working of the electronic speed controller 221. It should be noted that, a dust-proof ring 217 is disposed in the bottom cover 21 and located above each bottom cover heat dissipation hole 214, and the dust-proof ring 217 is fixedly connected to the bottom cover reinforcing ribs 212 through adhesive and dispense, so as to prevent foreign matter and particles from entering the motor through the interior of the integrated motor, thereby improving the dust-proof level of the integrated motor.

At the same time, two lampshade mounting ribs 215 extend outward from the periphery of the cavity body 211 and is fixedly connected to the bottom cover sleeve ring 213, a lampshade mounting hole 216 is defined between the two lampshade mounting ribs 215. A wire hole 2114 is defined on a side wall of the cavity body 211 opposite to the lampshade mounting hole 216. It should be noted that, in addition to that each bottom cover heat dissipation hole 214 around the cavity body 211 dissipates heat generated during the working of the electronic speed controller 221, thermally conductive silicone grease for conducting heat is further pasted between the electronic speed controller 221 and the accommodating groove 2111 of the cavity body 211, and the thermally conductive silicone grease is in direct contact with one end of the electronic speed controller 221 which is convenient for dissipating the heat generated during the working of the electronic speed controller 221. Meanwhile, a toothed heat dissipation groove 218 is defined on an outer surface of the cavity body 211, that is, the bottom surface of the bottom cover 21, so that the heat dissipation effect during the working of the electronic speed controller 221 and a service life of the electronic speed controller 221 is prolonged.

As shown in FIG. 2, the top cover 111, the tubular hosing 112, and the bottom cover 21 are enclosed to form an accommodating space for accommodating the motor sub-assembly 12 and the electronic speed controller sub-assembly 22. The tubular housing 112 needs to rotate with respect to the motor winding iron core 124, there is a gap between the tubular housing 112 and the bottom cover 21, so that the bottom cover 21 is prevented from wearing the tubular housing 112 during rotation of the tubular housing 112, however, in the actual use process, external gravel, rainwater, etc. easily enters the interior of the integrated motor through the gap to damage the interior of the integrated motor. Therefore, in order to better protect the interior of the integrated motor, a second end of the tubular housing 112 is away from the top cover 111, a first joint portion 1121 is disposed on the second end of the tubular housing 112, a second joint portion 2131 matched with the first joint portion 1121 is disposed on the bottom cover sleeve ring 213 of the bottom cover 21, the first joint portion 1121 includes an inclined surface matched with an inclined surface of the second joint portion 2131. In the embodiment, a cross section of the first joint portion 1121 and a cross section of the second joint portion 2131 are both tapered surfaces, thereby preventing the external gravel, the rainwater, etc. from entering the interior of the integrated motor through the gap between the tubular housing 112 and the bottom cover 21 to damage the interior of the integrated motor, moreover, during operation of the integrated motor, airflow generated when the tubular housing 112 rotates with respect to the bottom cover 21 sweeps out the external gravel, the rainwater, etc. in a gap between the first joint portion 1121 and the second joint portion 2131.

The electronic speed controller sub-assembly 22 includes an electronic speed controller 221, a lampshade assembly 222, and a wire hole rubber sleeve 223. the electronic speed controller 221 is disposed in the accommodating groove 2111, the lampshade assembly 222 is disposed in the lampshade mounting hole 216, and the wire hole rubber sleeve 223 is matched with the wire hole 2114. In the embodiment, a magnetic encoder is connected to the electronic speed controller 221, the magnetic encoder directly faces the rotating shaft 121 of the motor sub-assembly 12. When the integrated motor runs, running parameters, such as rotating speeds of the integrated motor, are accurately recorded, so that users may conveniently master a running state of the integrated motor in real time. It should be noted that, in order to improve protection for the electronic speed controller 221 in a use process of the integrated motor, after the electronic speed controller 221 is embedded in the cavity body 211, potting adhesive is poured on the electronic speed controller 221, the electronic speed controller 221 is encapsulated, and the potting adhesive may avoid a risk that the electronic speed controller 221 is corroded and damaged by invasion of the external gravel and the rainwater in the use process of the integrated motor, so that the electronic speed controller 221 is protected to a maximum extent. An LED lamp is disposed in the lampshade assembly 222, and the lampshade assembly 222 is embedded in the lampshade mounting hole 216 on the bottom cover 21 through screws, so as to provide a navigation light function for the integrated motor, thereby improving user experience. The wire hole rubber sleeve 223 is embedded in the wire hole 2114 on the cavity body 211, a power wire passes through the wire hole rubber sleeve 223 to be connected to an external power supply, and the wire hole rubber sleeve 223 is designed to not only protect the power wire, avoid a risk that a metal piece of the bottom cover 21 cuts the power wire to cause electric leakage to damage the integrated motor, improve use safety of the integrated motor, but also prevent the potting adhesive from overflowing in a process of potting the electronic speed controller 221 with the potting adhesive.

It should be noted that, the integrated motor further includes a connector 30, the connector 30 is detachably connected to one side of the bottom cover 21 away from the top cover 111 through the first connecting portions 132.

In an actual application process of the integrated motor, a specific assembly process of the integrated motor of the present disclosure is as follows.

The cover assembly 10 is first assembled, specifically, the dust-proof cover 113 is mounted and fixed in the top cover 111 through the screws, then the tubular housing 112 is nested on the top cover sleeve ring 1113 of the top cover 111, and the reinforcing ring 114 is sleeved on the outer wall of the tubular housing 112, so that the housing sub-assembly 11 is obtained. The magnetic blocks 122 are then correspondingly disposed in each clamping groove 1117 on the inner wall of the tubular housing 112, the bearing 123 is mounted in the bearing limiting groove of the fixing portion 131 of the connecting sub-assembly 13, the motor winding iron core 124 is pressed on the periphery of the fixing portion 131, the connecting sub-assembly 13 assembled with the bearing 123 and the motor winding iron core 124 is mounted in housing sub-assembly 11, the rotating shaft 121 is inserted into a middle of the top cover 111, the rotating shaft 121 further passes through the bearing 123 mounted in the fixing portion 131, and the motor sub-assembly 12 and the housing sub-assembly 11 are fixedly connected through a gasket and the screws, so that the cover assembly 10 shown in FIG. 4 is obtained.

Figure 4:
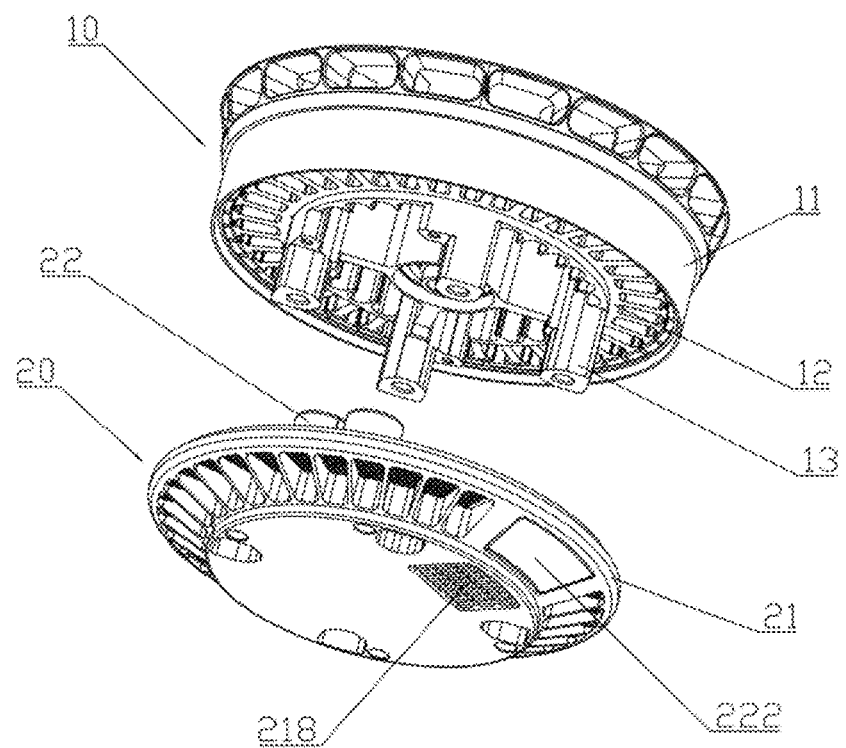
FIG. 4 is a structural schematic diagram of a cover assembly and a housing assembly of the integrated motor according to one embodiment of the present disclosure.

The box assembly 20 is then assembled, specifically, the electronic speed controller 221 is first fixed in the cavity body 211, the wire hole rubber sleeve 223 is embedded in the wire hole 2114, the lampshade assembly 222 is fixed in the lampshade mounting hole 216 through the screws, the dust-roof ring 217 is fixed on each bottom cover heat dissipation hole 214 through the adhesive and dispense, the potting adhesive is then poured on the electronic speed controller 221 for potting, and after the potting adhesive is solidified, the housing assembly 20 shown in FIG. 4 is obtained.

Figure 6:
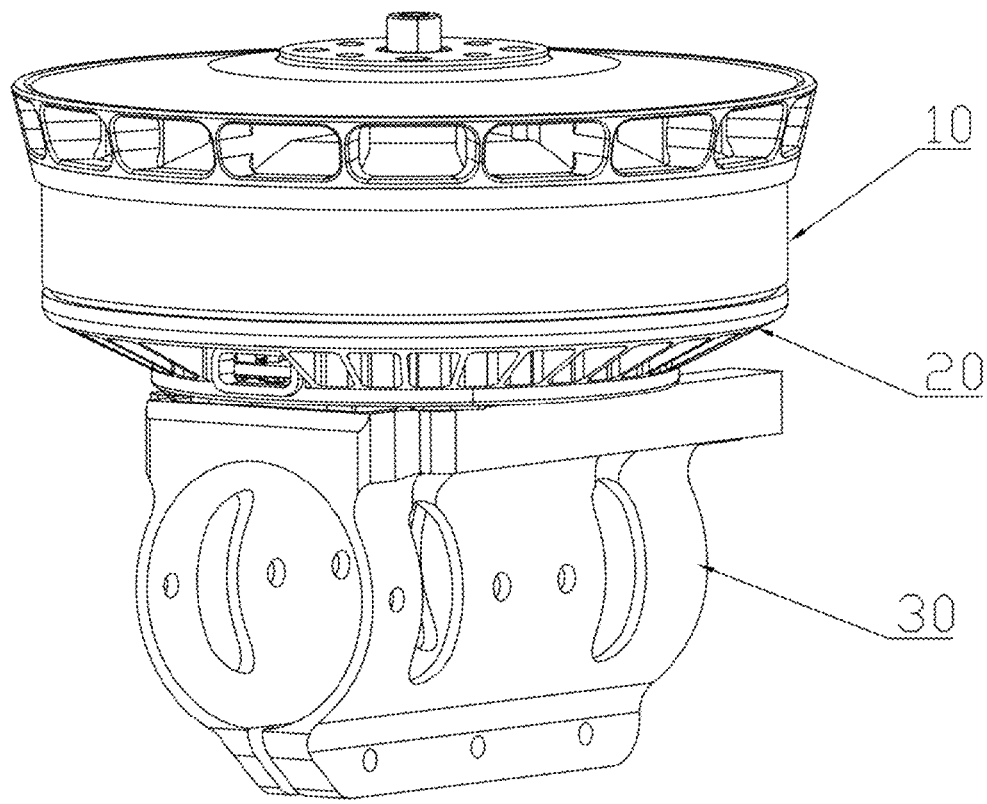
FIG. 6 is another structural schematic diagram of the integrated motor according to one embodiment of the present disclosure.

The cover assembly 10 and the housing assembly 20 are then assembled, the first connecting portions 132 of the connecting sub-assembly 13 are correspondingly inserted into the connecting through holes 2112 on the cavity body 211, and when the second connecting portions 133 of the connecting sub-assembly 13 is in close contact with the bottom cover connecting portions 2113 in the cavity body 211, the countersunk screws pass through the through holes on the bottom cover connecting portions 2113 to screw with the screw holes on the second connecting portions 133, thereby fixedly connecting the housing assembly 20 and the cover assembly 10, in this way, the integrated motor shown in FIG. 1 is obtained. If the connector 30 needs to be mounted, cap head screws are provided to insert into the screw holes on the first connecting portions 132, so that the connector 30 is fixedly connected to the integrated motor, in this way, the integrated motor shown in FIG. 6 is obtained. The integrated motor is capable of being mounted on a corresponding device through the connector 30 for use, which improves applicability of the integrated motor of the present disclosure, and it should be noted that, the connector 30 of the present disclosure is not limited to a structural shape in the drawings, or may be another connection structure capable of achieving the purpose of the present disclosure.

Based on above, the integrated motor of the present disclosure is provided with the cover assembly and the housing assembly to form a housing main body for mounting the motor sub-assembly and the electronic speed controller sub-assembly at the same time, and the connecting sub-assembly is further provided to achieve detachable connection between the motor sub-assembly and the electronic speed controller sub-assembly, so that the integrated motor is convenient in assembly and disassembly, simple and compact in assembly structure, and small in size. Moreover, the motor sub-assembly and the electronic speed controller sub-assembly are both disposed in the housing main body, in this way, the motor sub-assembly and the electronic speed controller sub-assembly are avoided from being in direct contact with external environment, and protection performance of the motor sub-assembly and the electronic speed controller sub-assembly is further improved. Meanwhile, the top cover reinforcing ribs are defined on the cover assembly to form each top cover heat dissipation holes, the bottom cover reinforcing ribs are defined on the housing assembly to form each bottom cover heat dissipation hole, so that the structural strength of the integrated motor is improved to the maximum extent, and the motor sub-assembly and the electronic speed controller are better protected, moreover, heat generated during working of the electronic speed controller and the integrated motor is effectively dissipated through heat dissipation structures, such as the top cover heat dissipation hole, the bottom cover heat dissipation hole, and the toothed heat dissipation groove. In this way, the heat dissipation effect of the integrated motor is improved, and service lives of the integrated motor and the electronic speed controller are prolonged.

Terms throughout the specification, including "one embodiment", "some embodiments", "an example", "a specific example", or "some examples", refer to that particular features, structures, materials, or characteristics described in the embodiments or examples are included in at least one embodiment or example of the present disclosure. In the specification, schematic representations of the above terms do not necessarily refer to the same embodiment or example. Furthermore, the particular features, structures, materials, or characteristics may be combined in any suitable manner in one or more embodiments or examples.

The above only expresses several embodiments of the present disclosure, and description thereof is relatively specific and detailed, but cannot be understood as a limitation to a protection scope of the present disclosure. It should be noted that, for those who skilled in the art, several modifications and improvements may be made without departing from a concept of the present disclosure, which shall all fall within the protection scope of the present disclosure. Therefore, the protection scope of the present disclosure shall be subject to the appended claims.

What is claimed is:

1. An integrated motor, comprising:
   a cover assembly; and
   a housing assembly;
   wherein the housing assembly is detachably connected to the cover assembly; the cover assembly comprises a housing sub-assembly, a motor sub-assembly, and a connecting sub-assembly, the motor sub-assembly is disposed in the housing sub-assembly, and the connecting sub-assembly is matched with the housing assembly; the housing sub-assembly comprises a top cover and a tubular housing, the tubular housing is connected to the top cover; the housing assembly comprises a bottom cover and an electronic speed controller sub-assembly, the bottom cover is matched with the tubular housing, and the electronic speed controller sub-assembly is disposed in the bottom cover; the top cover, the tubular hosing, and the bottom cover are enclosed to form an accommodating space for accommodating the motor sub-assembly and the electronic speed controller sub-assembly;
   the connecting sub-assembly comprises a fixing portion, first connecting portions, and second connecting portions, the first connecting portions and the second connecting portions extend outward from the fixing portion, a bearing limiting groove is defined on the fixing portion, end surfaces of the first connecting portions extend further than end surfaces of the second connecting portions, and screw holes are respectively defined on both the first connecting portions and the second connecting portions;
   the motor sub-assembly comprises a rotating shaft, a bearing, a motor winding iron core, and magnetic blocks, the rotating shaft is connected to the top cover, the bearing is fixed in the bearing limiting groove, the motor winding iron core is fixedly connected to a periphery of the fixing portion, and the magnetic blocks are fixedly connected to an inner wall of the tubular housing;
   the top cover comprises a cover plate, top cover reinforcing ribs, and a top cover sleeve ring, the top cover reinforcing ribs extend outward from an inner wall of the cover plate, and the top cover reinforcing ribs are fixedly connected to the top cover sleeve ring; a rotating shaft mounting hole is defined on the cover plate and is matched with the rotating shaft, a top cover heat dissipation hole is defined between adjacent two of the top cover reinforcing ribs; clamping blocks extend outward from one side of the top cover sleeve ring away from the inner wall of the cover plate, and a clamping groove for limiting a corresponding one of the magnetic blocks is defined between adjacent two of the clamping blocks; and
   the bottom cover comprises a cavity body, bottom cover reinforcing ribs, and a bottom cover sleeve ring, the bottom cover reinforcing ribs extend outward from a periphery of the cavity body, and the bottom cover reinforcing ribs are fixedly connected to the bottom cover sleeve ring; a bottom cover heat dissipation hole is defined between adjacent two of the bottom cover reinforcing ribs, two lampshade mounting ribs extend outward from the periphery of the cavity body and is fixedly connected to the bottom cover sleeve ring, a lampshade mounting hole is defined between the two lampshade mounting ribs.

2. The integrated motor according to claim 1, wherein the cavity body comprises an accommodating groove, connecting through holes, and bottom cover connecting portions, the connecting through holes are respectively matched with the first connecting portions, and the bottom cover connecting portions are respectively matched with the second connecting portions; a wire hole is defined on a side wall of the cavity body, and a toothed heat dissipation groove is defined on an outer surface of the cavity body.

3. The integrated motor according to claim 2, wherein the electronic speed controller sub-assembly comprises an electronic speed controller, a lampshade assembly, and a wire hole rubber sleeve; the electronic speed controller is fixedly connected to an inner surface of the cavity body, the lampshade assembly is fixedly connected in the lampshade mounting hole, and the wire hole rubber sleeve is matched with the wire hole, a magnetic encoder is connected to the electronic speed controller.

4. The integrated motor according to claim 1, wherein a first end of the tubular housing is close to the top cover, an inner wall of a first side of the tubular housing is attached to an outer wall of the top cover sleeve ring, and a reinforcing ring is fixedly connected to an outer wall of the first side of the tubular housing; a second end of the tubular housing is away from the top cover, a first joint portion is disposed on the second end of the tubular housing, a second joint portion matched with the first joint portion is disposed on the bottom cover sleeve ring, the first joint portion comprises an inclined surface matched with an inclined surface of the second joint portion.

5. The integrated motor according to claim 1, wherein the cover assembly further comprises a dust-proof cover, the dust-proof cover is fixedly connected to the top cover; the housing assembly further comprises a dust-proof ring, the dust-proof ring is fixedly connected to the bottom cover.

6. The integrated motor according to claim 1, wherein the integrated motor further comprises a connector, the connector is detachably connected to one side of the bottom cover away from the top cover through the first connecting portions.

* * * * *